(12) United States Patent
Okayama et al.

(10) Patent No.: US 6,842,540 B1
(45) Date of Patent: Jan. 11, 2005

(54) SURVEILLANCE SYSTEM

(75) Inventors: Masataka Okayama, Fujisawa (JP); Harumi Morino, Yokohama (JP); Takeo Tomokane, Yokohama (JP); Kenji Watanabe, Ebina (JP); Koichi Inoue, Odawara (JP); Tomohisa Kohiyama, Yokohama (JP); Akio Hayashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 704 days.

(21) Appl. No.: 09/643,759

(22) Filed: Aug. 23, 2000

(30) Foreign Application Priority Data

Oct. 4, 1999 (JP) .......................................... 11-282425

(51) Int. Cl.[7] .............................. G06K 9/36; G06K 9/46
(52) U.S. Cl. ....................... 382/246; 382/166; 382/250; 382/284; 348/155
(58) Field of Search ................................. 382/103–105, 382/166, 232, 236, 239, 244–250, 284; 342/357.01, 357.06, 357.12; 348/143, 152, 155; 708/203; 709/247

(56) References Cited

U.S. PATENT DOCUMENTS

| | | | | | |
|---|---|---|---|---|---|
| 4,829,526 | A | * | 5/1989 | Clark et al. .................. | 714/762 |
| 4,851,906 | A | * | 7/1989 | Koga et al. .............. | 348/413.1 |
| 5,530,759 | A | * | 6/1996 | Braudaway et al. ........... | 380/54 |
| 5,627,586 | A | * | 5/1997 | Yamasaki .................... | 348/169 |
| 5,677,979 | A | * | 10/1997 | Squicciarini et al. ......... | 386/46 |
| 5,768,446 | A | * | 6/1998 | Reasoner et al. ............ | 382/304 |
| 6,181,831 | B1 | * | 1/2001 | Sadjadian ................... | 382/276 |
| 6,275,599 | B1 | * | 8/2001 | Adler et al. ................ | 382/100 |
| 6,275,831 | B1 | * | 8/2001 | Bodnar et al. .............. | 707/201 |
| 6,314,518 | B1 | * | 11/2001 | Linnartz ..................... | 713/176 |
| 6,332,030 | B1 | * | 12/2001 | Manjunath et al. ......... | 382/100 |

FOREIGN PATENT DOCUMENTS

| | | |
|---|---|---|
| JP | 7-74924 | 3/1995 |
| JP | 9-46635 | 2/1997 |
| JP | 10-108180 | 4/1998 |
| JP | 11-16059 | 1/1999 |
| JP | 11-98461 | 4/1999 |
| JP | 11-103445 | 4/1999 |

OTHER PUBLICATIONS

"CCTV Surveillance System Basis Course", M. Takahashi et al, Industrial Development Organization Corporation, pp. 88–91.

* cited by examiner

*Primary Examiner*—Yon J. Couso
*Assistant Examiner*—Yubin Hung
(74) *Attorney, Agent, or Firm*—Mattingly, Stanger & Malur, P.C.

(57) ABSTRACT

A surveillance image is acquired from a surveillance camera. Supplement information (such as date and time, and surveillance camera number) relating to the surveillance image is acquired. By imaging the supplement information, supplement information image data is generated. A quantized discrete cosine transform coefficient block obtained by conducting discrete cosine transform and then quantization on surveillance image data of the surveillance image is added to a quantized discrete cosine transform coefficient block obtained by conducting discrete cosine transform and then quantization on the supplement information image data. A resultant sum is subjected to Huffman encoding. The result is recorded.

21 Claims, 13 Drawing Sheets

VIDEO DATA OUTPUTTED FROM FRAME SWITCHER 6

| ... | a1 | b1 | c1 | d1 | a2 | b2 | c2 | d2 | a3 | ... | a1,a2,a3: IMAGE PICKED UP BY
　　　　　SURVEILLANCE CAMERA 7a
b1,b2: IMAGE PICKED UP BY
　　　　SURVEILLANCE CAMERA 7b
c1,c2: IMAGE PICKED UP BY
　　　　SURVEILLANCE CAMERA 7c
d1,d2: IMAGE PICKED UP BY
　　　　SURVEILLANCE CAMERA 7d

CAMERA NO:1

IMAGE PICKUP PLACE:CONFERENCE ROOM

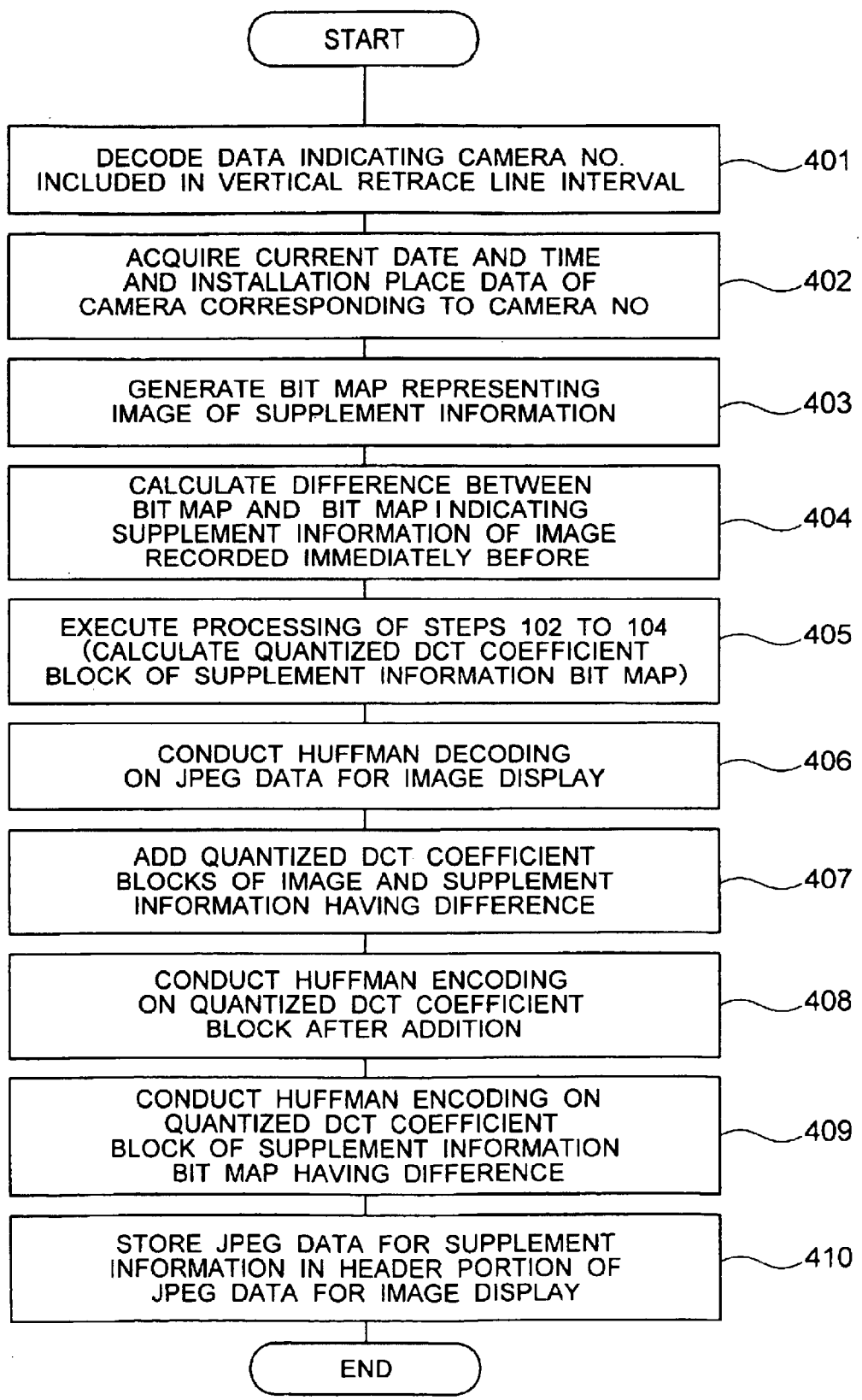

FIG. 12

32 PIXELS IN HORIZONTAL DIRECTION

16 PIXELS IN VERTICAL DIRECTION

| 1 | 2 | 3 | 4 |
|---|---|---|---|
| 5 | 6 | 7 | 8 |

FIG. 13A

| 1a | 2a | 3a | 4a |
|----|----|----|----|
| 5a | 6a | 7a | 8a |

FIG. 13B

| 1b | 2b | 3b | 4b |
|----|----|----|----|
| 5b | 6b | 7b | 8b |

FIG. 13C

| 1c | 2c | 3c | 4c |
|----|----|----|----|
| 5c | 6c | 7c | 8c |

SURVEILLANCE SYSTEM

BACKGROUND OF THE INVENTION

The present invention relates to a surveillance system for recording images picked up by a surveillance camera.

In conventional surveillance systems aiming at crime prevention or the like, a long time recording VTR (video tape recorder) called time-lapse VTR is used in many cases. In such a time-lapse VTR, an image picked up by a surveillance camera or the like is recorded in a VTR in an analog form, for a long time or as occasion demands.

On the other hand, rewritable and re-recordable storage media, such as magnetic disks like hard disks and optical magnetic disks like MOs and DVD-RAMs, are spreading with larger capacities and inexpensive prices. Such storage media are easy in maintenance as compared with video tape for analog recording VTR. Furthermore, since immediate reproduction (random reproduction) is possible, such storage media tend to be used as recording media of time-lapse VTRS.

In conventional time-lapse VTRs, second, minute, o'clock, day, month, year of the time point when recording (image pickup) has been conducted are inserted in a picture for the purpose of image analysis at the time of reproduction as described in "CCTV surveillance system basic course" written by Masaaki Takahashi, and published by Industrial Development Organization Corporation, p. 89.

Furthermore, in order to facilitate retrieval of a desired image at the time of reproduction, such a scheme that supplement information is recorded simultaneously with an image picked up by a camera is disclosed in JP-A-9-46635.

In digital recording, an image picked up by a camera is typically subjected to image compression and then recorded. As a result, a larger quantity of images can be recorded. In JP-A-11-16059, there is disclosed such a scheme that an image picked up by a camera is compressed to JPEG and data of recording time is added to a header portion of JPEG.

In JP-A-11-103445, there are described a video recording device and a video editing device. In these devices, an MPEG video stream is generated from a video signal supplied from a camera. In addition, a subsidiary video stream is generated from bit map data of date and time information. The MPEG video stream and the subsidiary video stream are multiplexed and recorded. At the time of reproduction, display/non-display of the date and time information is switched over.

SUMMARY OF THE INVENTION

In time-lapse VTRs, it becomes indispensable to record date and time of recording so as to be associated with an image in order to retrieve, manage, and reproduce recorded images. In the above described example of conventional technique in which the second, minute, o'clock, day, month, year of the time point when recording (image pickup) has been conducted are inserted (overwritten) in a picture of each frame (or field) of a video signal, the date and time are recorded so as to be superposed on the picture. Therefore, image information of the portion having the date and time superposed thereon is lost. Thus there is a risk that the evidence capability for the purpose of crime prevention may be reduced. Especially, if various kinds of information, such as a number for identifying a surveillance camera used to pick up the image and an image pickup place, are superposed besides the date and time, then many portions of the recorded image are lost.

In JP-A-9-46635, video information is prevented from being lost by recording supplement information as a file different from that of the image. Since information to be recorded increases, however, recording time is not taken into consideration.

In JP-A-11-16059, recording time is increased by compressing an image to JPEG and adding supplement information to the header portion of the JPEG. In a surveillance system for crime prevention, however, there is needed means for certifying that the image is not falsified, in order to enhance the evidence capability of the recorded image. In the above described conventional technique, however, the evidence capability of the recorded image is not taken into consideration.

In JP-A-11-103445, simply a signal from an MPEG encoder and a signal from a subsidiary video encoder are multiplexed. It isn't that their respective images are combined. Therefore, the picked up image and the date and time information exist separately. It is not impossible to ensure the evidence property of the picked up image. Furthermore, falsification of the picked up image cannot be judged.

An object of the present invention is to provide a surveillance system which generates a surveillance image having a high evidence capability.

A surveillance system according to the present invention includes a surveillance camera and a surveillance image processor for processing surveillance image data obtained from the surveillance camera. In addition, the surveillance image processor includes supplement information image generation means for imaging supplement information relating to the surveillance image data and generating supplement information image data; combining means for combining data obtained in middle of JPEG encoding of the surveillance image data with data obtained in middle of JPEG encoding of the supplement information image data; and Huffman encoding means for conducting Huffman encoding on composite data obtained by the combining means.

According to the present invention, data (such as a quantized discrete cosine transform coefficient block) obtained in the middle of JPEG encoding of the surveillance image data is combined with data (such as a quantized discrete cosine transform coefficient block) obtained in the middle of JPEG encoding of the supplement information image data, and then Huffman encoding is conducted. As a result, the surveillance image and the supplement information image can be held as one JPEG data. Therefore, the evidence capability of the surveillance image can be enhanced. Furthermore, if its JPEG data is subjected to Huffman decoding by using a device used for Huffman encoding, then the supplement information image can be separated from the surveillance image easily. It is also possible to remove the supplement information and display only the surveillance image. Therefore, the evidence capability of the surveillance image can be enhanced.

A surveillance image processor according to the present invention includes input means for inputting a surveillance image picked up by a surveillance camera; supplement information image generation means for imaging supplement information relating to the surveillance image and generating supplement information image data; surveillance image compression means for compressing surveillance image data of the surveillance image; supplement information image compression means for compressing the supplement information image data; and combining means for combining data obtained in middle of compression of the surveillance image data with data obtained in middle of compression of the supplement information image data.

According to the present invention, data (such as a quantized discrete cosine transform coefficient block) obtained in the middle of compression of the surveillance image data is combined with data (such as a quantized discrete cosine transform coefficient block) obtained in the middle of compression of the supplement information image data. As a result, the surveillance image and the supplement information image can be held as one JPEG data. Therefore, the evidence capability of the surveillance image can be enhanced. Furthermore, if the compressed data is expanded by using a device used for compression, then the supplement information image can be separated from the surveillance image easily. It is also possible to remove the supplement information and display only the surveillance image. Therefore, the evidence capability of the surveillance image can be enhanced.

A surveillance image processor according to the present invention includes input means for inputting a surveillance image picked up by a surveillance camera; supplement information image generation means for imaging supplement information relating to the surveillance image and generating supplement information image data; compression means for conducting irreversible compression and then reversible compression on image data; and combining means for combining surveillance image data of the surveillance image subjected to the irreversible compression in the compression means with the supplement information image data subjected to the irreversible compression in the compression means. Furthermore, the compression means conducts reversible compression on composite data obtained by the combining means.

According to the present invention, data (such as a quantized discrete cosine transform coefficient block) obtained by irreversible compression on the surveillance image data is combined with data (such as a quantized discrete cosine transform coefficient block) obtained by irreversible compression on the supplement information image data, and then reversible compression is conducted. As a result, the surveillance image and the supplement information image can be held as one JPEG data. Therefore, the evidence capability of the surveillance image can be enhanced. Furthermore, if the compressed data is expanded by using a device used for reversible compression, then the supplement information image can be separated from the surveillance image easily. It is also possible to remove the supplement information and display only the surveillance image. Therefore, the evidence capability of the surveillance image can be enhanced.

A surveillance image reproducing device according to the present invention includes Huffman decoding means for conducting Huffman decoding on compressed data for image display, the compressed data for image display being obtained by conduction addition and then Huffman encoding on quantized data obtained by conducting discrete cosine transform and then quantization on surveillance image data of a surveillance image supplied from a surveillance camera and quantized data obtained by conducting discrete cosine transform and then quantization on supplement information image data relating to the surveillance image; separation means for separating the quantized data of the surveillance image data from the compressed data for image display subjected to Huffman decoding; decoding means for conducting dequantization and then inverse discrete cosine transform on the quantized data of the surveillance image data separated by the separation means; and output means for outputting the surveillance image data obtained by the decoding means.

According to the present invention, the supplement information image can be separated from the surveillance image easily, if Huffman decoding is conducted on the compressed data for image display by using a device used for Huffman encoding. It is also possible to remove the supplement information and display only the surveillance image. Therefore, the evidence capability of the surveillance image can be enhanced.

BRIEF DESCRIPTION OF THE DRAWINGS

FIG. 6 is a diagram of supplement information of a first embodiment;

FIG. 11 is a diagram showing a processing flow chart of an image recording method of a second FIG. 12 is a diagram of a bit map in a second embodiment;

FIGS. 13A, 13B and 13C are diagrams of a recorded image reproducing method of a second embodiment;

DESCRIPTION OF THE EMBODIMENTS

Figure 1:
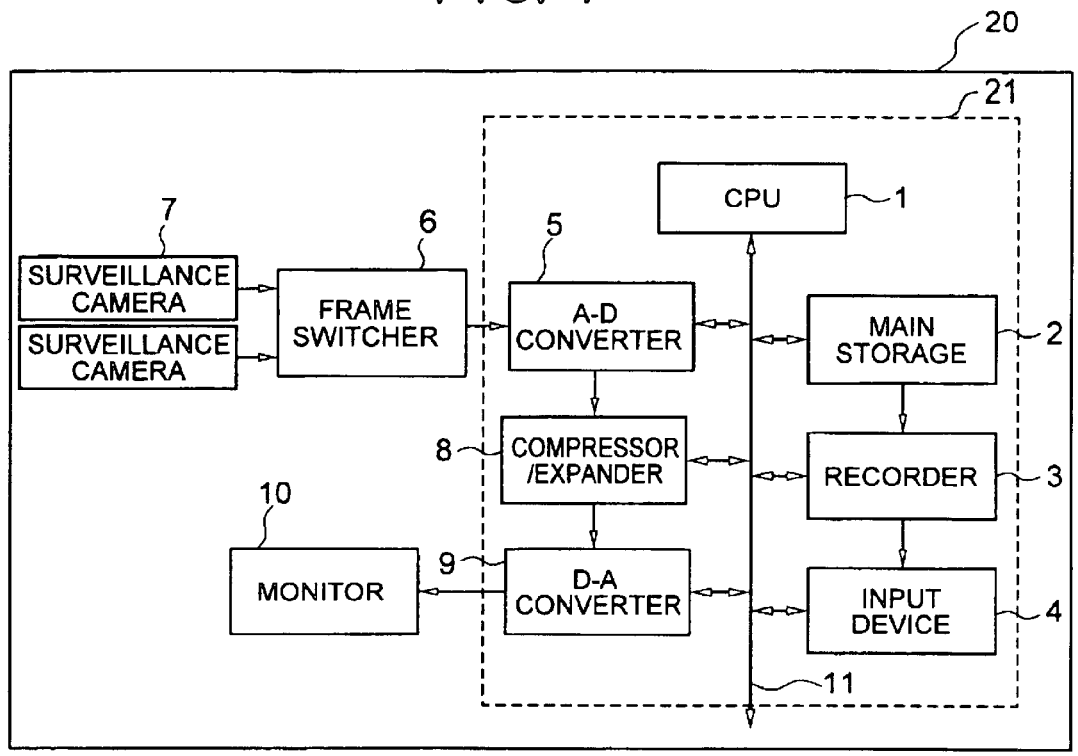
FIG. 1 is a hardware configuration diagram of a surveillance device of a present first embodiment.

FIG. 1 is a hardware configuration diagram of a surveillance device capable of conducting digital recording to which a digital surveillance system of an embodiment of the present invention can be applied.

As shown in FIG. 1, a surveillance device 20 includes a surveillance image processing device 21, a frame switcher 6, one or more surveillance cameras 7, and a monitor 10. The surveillance image processing device 21 includes a CPU 1, a main storage 2, a recorder 3, an input device 4, an A-D converter 5, a compressor/expander 8, a D-A converter 9, and a bus 11. Components other than the frame switcher 6, the surveillance camera 7, and the monitor 10 are connected via the bus 11 so as to be capable of transmitting necessary information between components.

Furthermore, the one or more surveillance cameras 7 are connected to the frame switcher 6, and the frame switcher 6 is connected to the A-D converter 5 so as to be capable of transmitting necessary information. Furthermore, the monitor 10 is connected to the D-A converter 9 so as to be capable of transmitting necessary information.

The CPU 1 conducts predetermined operation on the main storage 2 and the recorder 3 in accordance with a program stored beforehand.

The main storage 2 is means for functioning as a work area and storing necessary programs. For example, the main storage 2 can be implemented by using a RAM for the former cited function, and by using a ROM for the latter cited function.

The recorder 3 is means for preserving a program which is used to control the operation of the surveillance device 20, and recording and a preserving surveillance image picked up by a surveillance camera and supplement information (such as the date and time of image pickup, camera number, and image pickup place) relating to the surveillance image. The recorder 3 is implemented by using, for example, a hard disk, MO, DVD-RAM, or DVD-RW.

The input device 4 is means for inputting necessary instructions and information. For example, the input device 4 can be implemented by using a keyboard, a control pad, and a pointing device such as a mouse.

The A-D converter 5 is means for digitizing analog surveillance video data inputted from the frame switcher 6. The A-D converter 5 is connected to a compressor/expander 8. The surveillance video data digitized by the A-D converter 5 can be transmitted directly to the compressor/expander 8. Furthermore, there may be adopted such a configuration that the surveillance video data digitized by the A-D converter 5 can be transmitted to the compressor/expander 8 via bus 11. In this case, the A-D converter need not be connected to the compressor/expander 8.

In the vertical retrace line interval of analog surveillance video data inputted to the A-D converter 5, a camera number of a camera used to pick up the inputted surveillance video data is included. After the A-D converter 5 has digitized the surveillance video data, the A-D converter 5 transfers its image data portion to the compressor/expander 8, and transfers data indicating the camera number included in the vertical retrace line interval to the main storage 2.

The frame switcher 6 is means for switching over surveillance images supplied from the one or more surveillance cameras 7 connected to the frame switcher 6 every frame (or every field) and outputting a resultant surveillance image to the A-D converter 5. For example, the frame switcher as described in "CCTV surveillance system basic course" written by Masaaki Takahashi, and published by Industrial Development Organization Corporation, pp. 90 to 91 can be applied. Furthermore, depending upon the use and configuration of the surveillance system, one surveillance camera may be connected directly to the A-D converter 5. In this case, the frame switcher 6 is not required.

The surveillance camera 7 is means for taking in an analog surveillance image. The surveillance camera 7 is implemented by using, for example, a CCD camera. Furthermore, the surveillance camera 7 has means for attaining synchronization with other cameras. In the case where at least two surveillance cameras 7 are connected to the frame switcher 6, the frame switcher 6 is adapted to be capable of switching over surveillance images supplied from surveillance cameras every frame (or every field) and outputting a resultant surveillance image to the A-D converter 5. One surveillance camera 7 may be installed, or a plurality of surveillance cameras 7 may be installed.

The compressor/expander 8 is means for compressing (encoding) surveillance video data digitized by the A-D converter 5 and expanding (decoding) the compressed video data. As for the compression and expansion scheme, JPEG, MPEG, H.261, or H.263 can be applied. In JPEG, the image quality is favorable because a still picture is compressed. Therefore, JPEG is suitable for surveillance. Hereafter, description will be given by taking JPEG encoding as an example. The present invention is not restricted to JPEG encoding.

The surveillance video data compressed by the compressor/expander 8 is transferred to the main storage 2 or the recorder 3 via the bus 11. Furthermore, in the case where the compressed surveillance video data is reproduced and displayed by using the monitor 10, the compressed surveillance video data is transferred to the compressor/expander 8 via the bus 11. The surveillance video data expanded by the compressor/expander 8 is transferred to the D-A converter 9.

The compression/expansion processing of JPEG, MPEG, or the like may be conducted in a form of software processing by using the CPU 1. In this case, the compressor/expander 8 may be eliminated from the configuration of FIG. 1. In the case of compression and expansion processing using software, the surveillance video data (including data indicating the camera number included in the vertical retrace line interval) digitized by the A-D converter 5 is transferred to the main storage 2 via the bus 11, and compressed by the software. Furthermore, the surveillance video data expanded by the software is transferred to the D-A converter 9 via the bus 11.

The D-A converter 9 is means for converting the digital surveillance video data expanded by the compressor/expander 8 into an analog signal. The D-A converter 9 is connected to the compressor/expander 8. The surveillance video data expanded by the compressor/expander 8 can be transmitted directly to the D-A converter 9. Alternatively, there may be adopted such a configuration that the surveillance video data expanded by the compressor/expander 8 can be transmitted to the D-A converter 9 via the bus 11. In this case, the D-A converter 9 need not be connected to the compressor/expander 8.

The monitor 10 is means for displaying the surveillance video data converted to the analog signal by the D-A converter 9. The monitor 10 can be implemented by using a TV monitor, an NTSC monitor, or the like.

Figure 2:
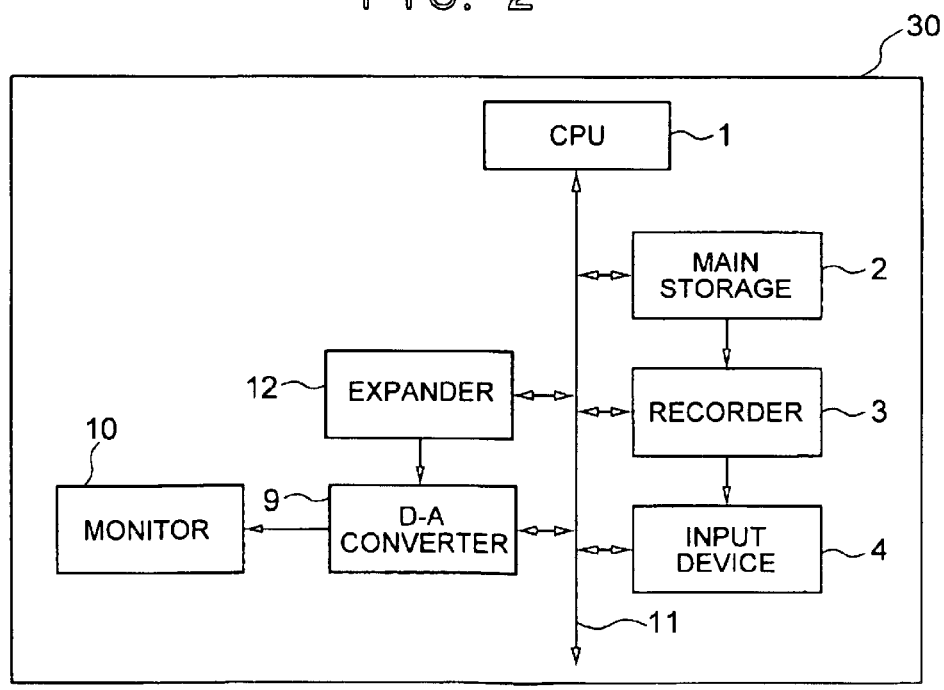
FIG. 2 is a hardware configuration diagram of a surveillance video reproducing device of a present first embodiment.

In the case where a component of the surveillance device 20 is not directly related to the input or output of data and program, the component can be removed from the configuration of FIG. 1. Furthermore, the surveillance video data recorded by the surveillance device 20 can also be reproduced by a device different from the surveillance device 20. A surveillance video reproducing device 30 capable of reproducing the surveillance video data recorded by the surveillance device 20 is implemented by, for example, a device as shown in FIG. 2. In FIG. 2, the same reference numerals as those of FIG. 1 denote like components.

An expander 12 is means formed of the expander portion of the compressor/expander 8. Instead of the expander 12, the compressor/expander 8 may be used as it is. Furthermore, there may be adopted such a configuration that the surveillance video data expanded by the expander 12 can be transmitted to the D-A converter 9 via the bus 11. In this case, the D-A converter 9 need not be connected to the the expander 12.

The expansion processing of JPEG, MPEG, or the like may be conducted in a form of software processing by using the CPU 1. In this case, the expander 12 may be eliminated from the configuration of FIG. 2. In the case of expansion processing using software, the video data expanded by the software is transferred to the D-A converter 9 via the bus 11.

The surveillance video data recorded by the surveillance device in FIG. 1 is preserved in the recorder 3. If the recorder 3 is formed of a removable disk device such as a MO or a DVD-RAM, then a recorder 3 in the surveillance video reproducing device 30 of FIG. 2 is formed of a removable disk device in the same way. The surveillance video data recorded by the surveillance device 20 is stored in the recorder 3 in the surveillance video reproducing device 30 via the removable disk device. If the recorder of FIG. 1 is formed of a fixed disk device such as a hard disk, then each of the surveillance device 20 and the surveillance video reproducing device 30 includes a communication controller connected to the bus 11, and the communication control device of the surveillance device 20 and the communication control device of the surveillance video reproducing device 30 are connected to each other via a network such as a phone line or a LAN. The surveillance video data compressed by the surveillance device 20 is transferred to the surveillance video reproducing device 30 via the network, and stored in the recorder 3 in the surveillance video reproducing device 30.

Thus, a surveillance system can be formed of one or more surveillance devices 20 and one or more surveillance video reproducing devices 30. Since the surveillance device 20 is formed so as to be capable of conducting compression and expansion, however, the system can also be formed of only the surveillance devices 20.

A recording and reproducing scheme of surveillance video data implemented by a program operating on the surveillance device 20 will now be described in detail. The program is stored in the main storage 2 and the recorder 3. In response to some event, such as a user's order inputted by using the input device 4 or power switching on, the program is executed by the CPU 1.

First of all, a first embodiment of a recording scheme for preserving surveillance video data picked up by at least one surveillance camera 7 in the recorder 3 will now be described. In the ensuing description, it is assumed that JPEG is used as the compression and expansion scheme in the compressor/expander 8 of the first embodiment.

In the first embodiment, surveillance video data from the at least one surveillance camera 7 is inputted to the A-D converter 5 via the frame switcher 6. For example, if data inputted from the surveillance camera 7 is surveillance video data of the NTSC form, then the A-D converter 5 decodes and digitizes the surveillance video data of the NTSC form. The digitized surveillance video data is transferred to the compressor/expander 8 and encoded to the JPEG. If data inputted from the surveillance camera 7 is surveillance video data of the NTSC form, then video data of approximately 30 frames (60 fields) per second is inputted to the compressor/expander 8. The compressor/expander 8 encodes the surveillance video data to the JPEG in accordance with a predetermined frame rate. For example, if one surveillance camera 7 is connected directly to the A-D converter 5 and it is specified to encode an image of one frame to JPEG per second, then the compressor/expander 8 extracts one frame from surveillance video data of 30 frames inputted for one second (i.e., a frame image sequence corresponding to 30 frames) and encodes the one frame to JPEG.

Figures 3A, 3B:
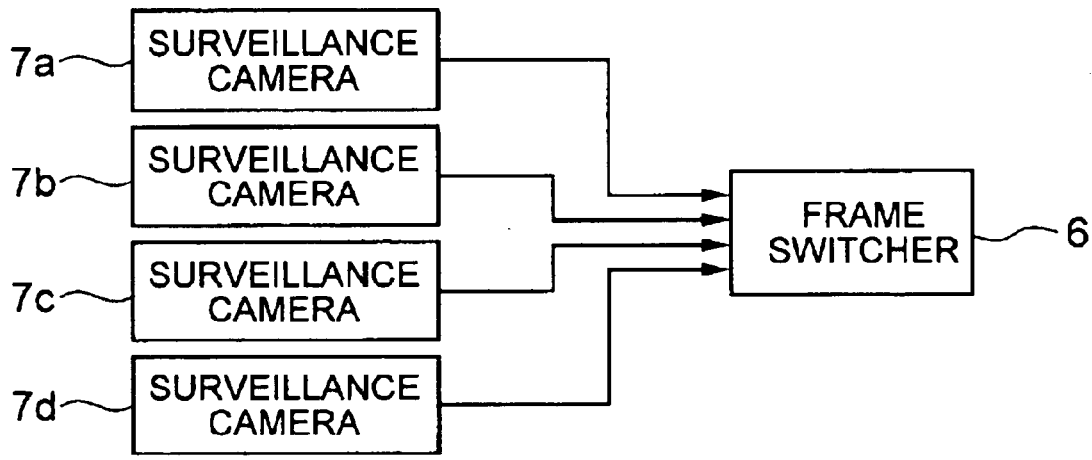
FIG. 3A is a diagram of surveillance cameras connected to a frame switcher and FIG. 3B is a diagram of a video data format of a first embodiment.

For example, if four surveillance cameras 7a to 7d are connected to the frame switcher 6 as shown in FIG. 3A, then surveillance video data as shown in FIG. 3B is outputted from the frame switcher 6 (the time difference between a frame image a1 and a frame image a3 is 8/30 second). If it is specified to encode an image of one frame to JPEG per second, therefore, then the compressor/expander 8 extracts one frame of each of surveillance images picked up by the surveillance cameras 7a to 7d, from surveillance video data of 30 frames inputted for one second. For example, the compressor/expander 8 extracts frame images a1, b1, c1 and d1, i.e., a total of four frames, and encodes them to JPEG.

In addition, the compressor/expander 8 may be adapted to transfer the surveillance video data as it is before JPEG encoding, to the D-A converter 9, simultaneously with encoding of the inputted surveillance video data of approximately 30 frames/second to JPEG. By doing so, the surveillance video data picked up by the surveillance camera can be displayed on the monitor 10. Thus, real time perusal of the surveillance image becomes possible.

Processing of JPEG encoding conducted by the compressor/expander 8 will now be described by referring to a flow chart of FIG. 4.

Figure 4:
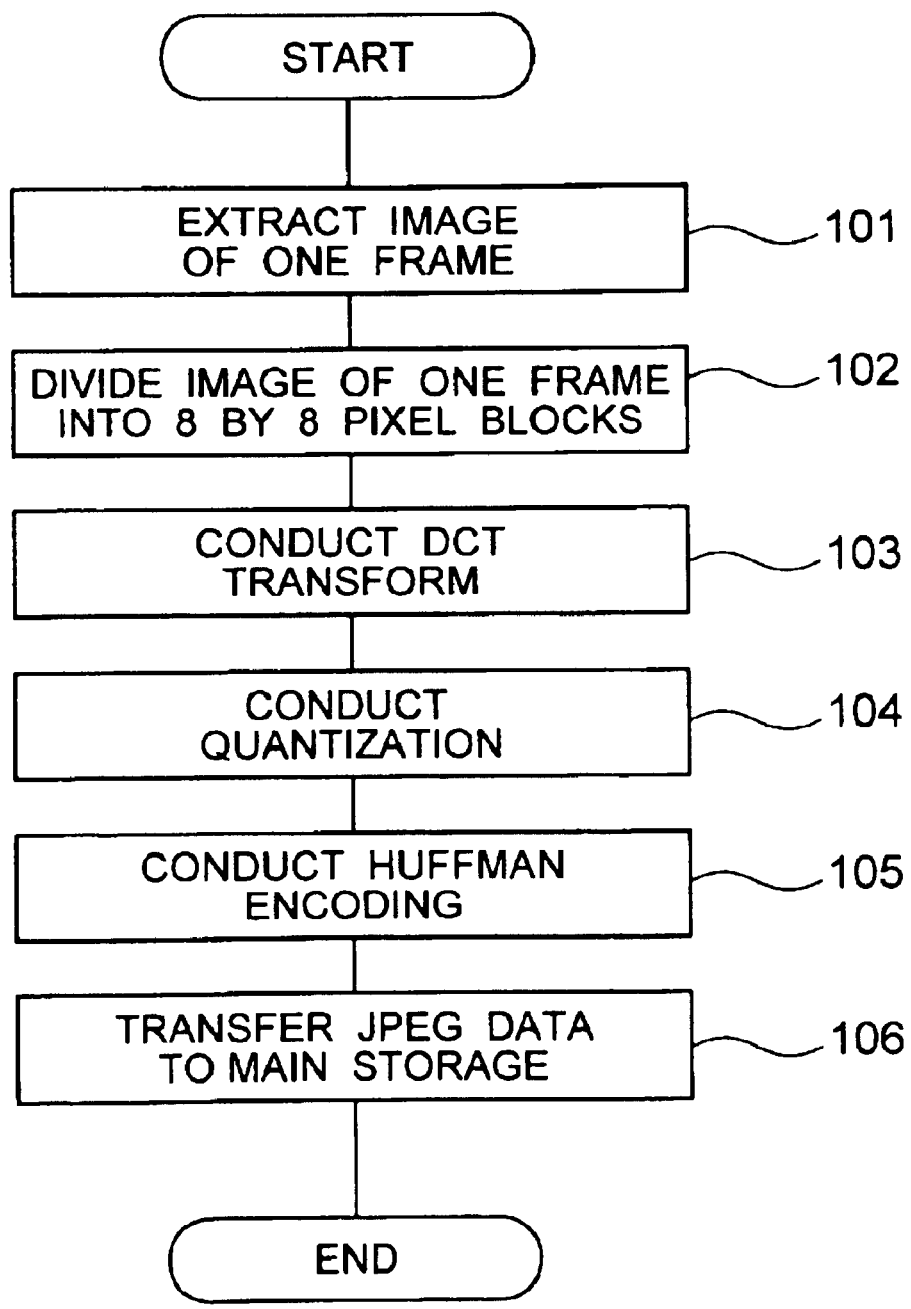
FIG. 4 is a diagram showing a processing flow chart of JPEG encoding of a first embodiment.

As shown in FIG. 4, one frame is first extracted from surveillance video data of 30 frames inputted for one second (i.e., a frame image sequence corresponding to 30 frames) (step 101). The surveillance image data of one frame is divided into 8 by 8 pixel blocks (step 102). For example, if the image size (resolution) of the surveillance image data is 640 by 480, then the surveillance image data is divided in 80 blocks in the horizontal direction and 60 blocks in the vertical direction.

Subsequently, DCT (Discrete Cosine Transform) is conducted on each of pixel blocks obtained by the division (step 103). The DCT is a kind of a compression scheme of the orthogonal transform. In other words, DCT is irreversible compression.

Hereafter, the block subjected to the DCT is referred to as DCT coefficient block. In the same way as the pixel block, each DCT coefficient block has a size of 8 by 8.

Subsequently, quantization is conducted on each DCT coefficient block by using a quantization table (step 104). As the quantization table, a block having 8 by 8 arbitrary quantization values is used. Quantization is a kind of a compression scheme of the orthogonal transform. In other words, quantization is irreversible compression. Quantization is implemented by dividing DCT coefficients included in the DCT coefficient block by quantization values corresponding to the quantization table. Hereafter, a block obtained by quantizing the DCT coefficient block is referred to as quantized DCT coefficient block.

Subsequently, the quantized DCT coefficient block is subjected to Huffman encoding which is a kind of entropy encoding (step 105). The Huffman encoding is reversible compression. In Huffman encoding, an 8 by 8 two-dimensional block is handled as one-dimensional data. By assigning a Huffman code to a combination of a run length of 0 and a category indicating the magnitude of a value to be encoded, Huffman encoding is conducted. Data obtained by this Huffman encoding becomes JPEG data. JPEG data includes image data information such as the numbers of pixels of encoded image data in the horizontal direction and in the vertical direction (i.e., image size), and the quantization table and a Huffman table used at the time of encoding, besides the Huffman encoded data. The JPEG data generated at the step 105 is called JPEG data for surveillance image.

Finally, the JPEG data for surveillance image obtained by encoding is transferred to the main storage 2 (step 106), and the processing is finished.

Subsequently, a scheme for combining supplement information with the JPEG data for surveillance image obtained by encoding in the compressor/expander 8 will now be described. In the present embodiment, it is assumed that the supplement information includes the date and time of image pickup, the camera number used for image pickup, and the installation place of the camera used for image pickup (image pickup place). However, supplement information which can be combined with the JPEG data for surveillance image is not limited to them. For example, the supplement information may be numerical values or graphs of the temperature, humidity, sound volume, and vibration.

As described above, data indicating the number of the camera used for image pickup is transferred from the A-D converter 5 to the main storage 2. Since the installation place of the camera is predetermined, data indicating the installation place of the camera used for image pickup is stored in the main storage 2 or the recorder 3 beforehand. Furthermore, a clock is incorporated in the surveillance device 20. Data indicating the date and time of image pickup can be obtained from the clock.

Processing for combining supplement information with the JPEG data for surveillance image obtained by encoding in the compressor/expander 8 will now be described by referring to a flow chart of FIG. 5.

Figure 5:
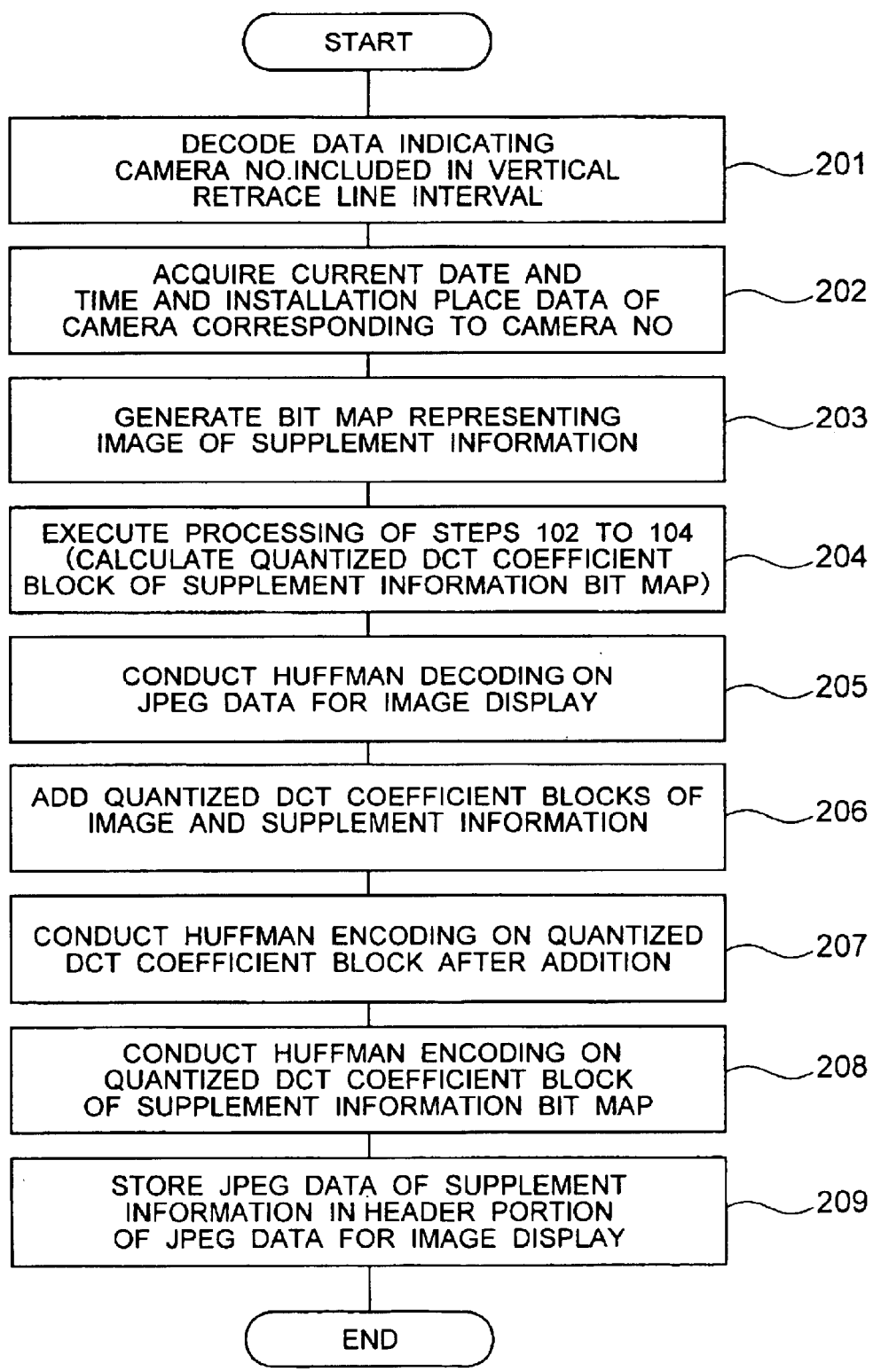
FIG. 5 is a diagram showing a processing flow chart of an image recording method of a first embodiment.

As shown in FIG. 5, data indicating a camera number included in the vertical retrace line interval transferred to the main storage 2 is first extracted and decoded (step 201). Furthermore, data indicating the installation place of a camera corresponding to the camera number obtained at the step 201 is acquired from the main storage 2 or the recorder 3, and the current date and time are acquired from the clock (step 202). Subsequently, in the compressor/expander 8, a bit map having an image size equivalent to or smaller than an image size of the JPEG data for surveillance image obtained by the processing of FIG. 4 in the compressor/expander 8 is generated, and a character string indicating the image pickup date and time, the camera number, and the image pickup place is drawn in arbitrary positions of the bit map (step 203). Instead of the bit map, PICT may be used. The supplement information need only be subjected to imaging. Data obtained by imaging the supplement information is called supplement information image data. An image example of the bit map is shown in FIG. 6.

In FIG. 6, a character string indicating the image pickup date and time ("99/4/2 1:02:30"), a character string indicating the camera number ("Camera number: 1"), and a character string indicating the image pickup place ("Image pickup place: council room") are displayed on the bit map.

With reference to FIG. 5, processing for combining the bit map of the supplement information with the JPEG data for surveillance image obtained by the processing of FIG. 4 is conducted in the compressor/expander 8. This can be conducted by using, for example, a scheme disclosed in JP-A-10-108180.

In other words, by conducting the processing of the steps 102 to 104 of FIG. 4 on the bit map of supplement information obtained at the step 203, a quantized DCT coefficient block group is generated (step 204). The processing of the step 204 may be conducted either in the compressor/expander 8 or with software in the CPU 1. Subsequently, by conducting Huffman decoding on the JPEG data for surveillance image obtained by the processing of FIG. 4, in the compressor/expander 8, a quantized DCT coefficient block group is extracted (step 205). In addition, the quantized DCT coefficient block group of the surveillance image and the quantized DCT coefficient block group of the supplement information obtained in the step 204 are added together (step 206). In other words, the quantized DCT coefficient block group of the surveillance image data and the quantized DCT coefficient block group of the supplement information data are combined. The quantized DCT coefficient block group after addition is subjected to Huffman encoding (step 207). Finally, the quantized DCT coefficient block group of the supplement information obtained at the step 204 is subjected to Huffman encoding (step 208). JPEG data of the supplement information obtained at the step 208 is stored in a header portion of JPEG data of the combined surveillance and supplement information images obtained at the step 207 (step 209), and the processing is finished. In other words, the JPEG data of a combination of the supplement information image data and surveillance image data is linked to the JPEG data of the supplement information image data. Herein, the JPEG data generated at the step 208 and the JPEG data generated at the step 209 are referred to as JPEG data for supplement information image and JPEG data for image display, respectively. The JPEG data for image display is preserved in the recorder 3 of the surveillance device 20.

In the case where the processing of the compressor/expander 8 is conducted by using software, the encoding of the surveillance image data and the encoding of the bit map may also be conducted simultaneously.

In the case where the surveillance image is already subjected to JPEG encoding as described above, the quantized DCT coefficient block group of the surveillance image data is obtained by conducting Huffman decoding on the JPEG data for surveillance image, and in addition, the quantized DCT coefficient block group of the supplement information image data is newly obtained by conducting DCT on the supplement information image data and then quantizing the result. And it is desirable to add the quantized DCT coefficient block group of the surveillance image data and the quantized DCT coefficient block group of the supplement information image data.

On the other hand, in the case where the supplement information image is already subjected to JPEG encoding, the quantized DCT coefficient block group of the supplement information image data is obtained by conducting Huffman decoding on the JPEG data for supplement information image, and in addition, the quantized DCT coefficient block group of the surveillance image data is newly obtained by conducting DCT on the surveillance image data obtained from the surveillance camera 7 and then quantizing the result. And it is desirable to add the quantized DCT coefficient block group of the surveillance image data and the quantized DCT coefficient block group of the supplement information image data.

In the case where both the surveillance image and the supplement information image are already subjected to JPEG encoding, the quantized DCT coefficient block group of the surveillance image data is obtained by conducting Huffman decoding on the JPEG data for surveillance image, and in addition, the quantized DCT coefficient block group of the supplement information image data is obtained by conducting Huffman decoding on the JPEG data for supplement information image. And it is desirable to add the quantized DCT coefficient block group of the surveillance image data and the quantized DCT coefficient block group of the supplement information image data.

It is also possible that the quantized DCT coefficient block group of the surveillance image data is newly obtained by conducting DCT on the surveillance image data obtained from the surveillance camera 7 and then quantizing the result, and in addition, the quantized DCT coefficient block group of the supplement information image data is newly obtained by conducting DCT on the supplement information image data and then quantizing the result.

A reproducing (decoding) scheme of the JPEG data for image display which is combined with supplement information, subjected to JPEG encoding, and then preserved in the recorder 3 of the surveillance device 20 or the surveillance video reproducing device 30 will now be described.

First of all, decoding processing of the JPEG data for image display will now be described by referring to a flow chart of FIG. 7.

Figure 7:
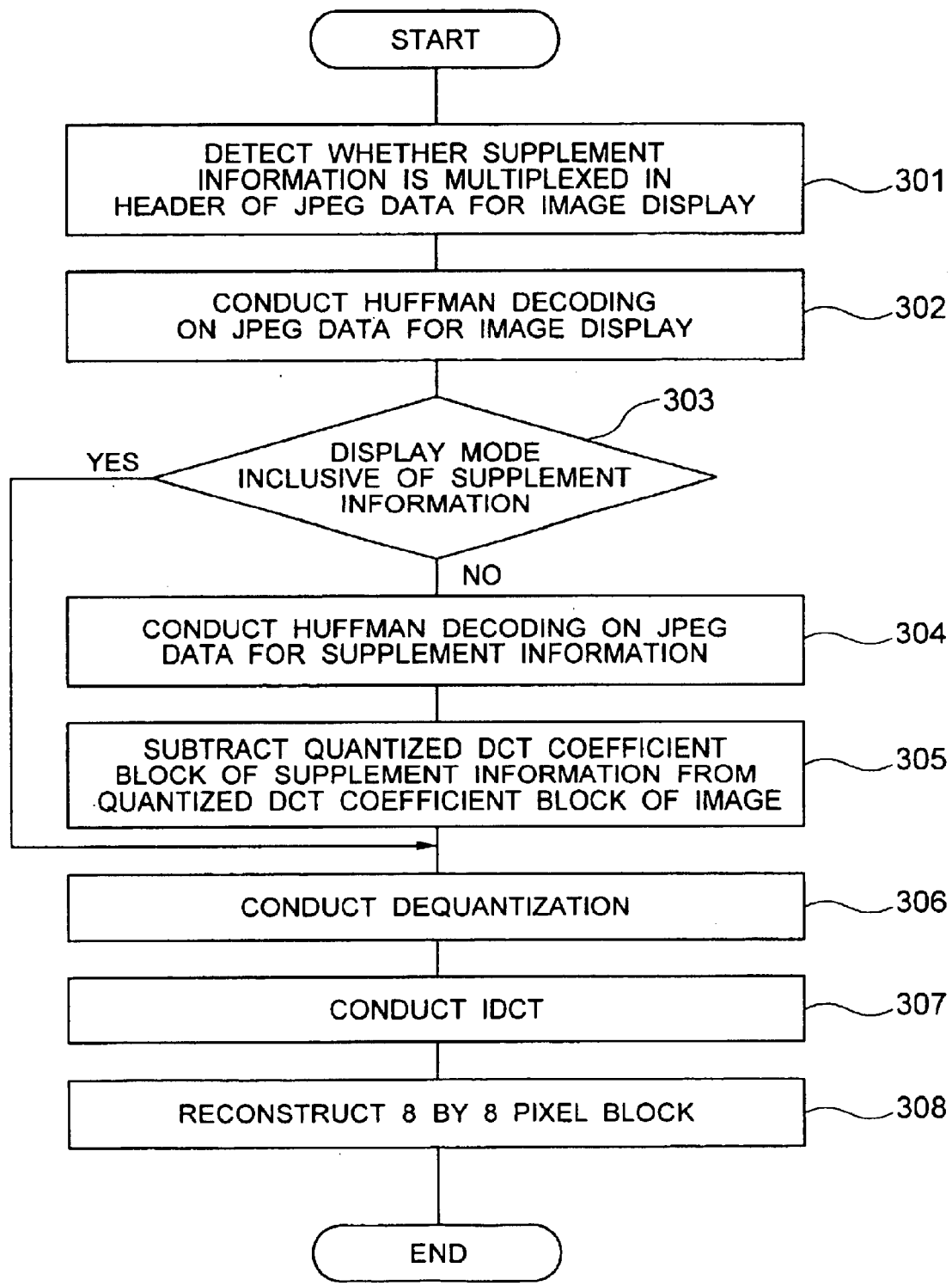
FIG. 7 is a diagram showing a processing flow chart of a recorded image reproducing method of a first embodiment.

As shown in FIG. 7, JPEG data for image display to be reproduced is first read out from the recorder 3. It is determined whether JPEG data for supplement information exists in the header portion of the JPEG data for image display (step 301). If the JPEG data for image display includes combined supplement information, then the JPEG data for image display is subjected to Huffman decoding to obtain the quantized DCT coefficient block group (step 302). Subsequently, it is determined whether the mode is an image display mode inclusive of the supplement information (step 303). It is now assumed that the display mode is specified by a user from the input device 4 or the like beforehand. If the mode is not the image display mode inclusive of the supplement information at the step 303, then the JPEG data for supplement information is extracted from the header portion of the JPEG data for image display, and the JPEG data for supplement information is subjected to Huffman decoding to obtain the quantized DCT coefficient block group (step 304). From the quantized DCT coefficient block group derived from the JPEG data for image display, the quantized DCT coefficient block group derived from the JPEG data for supplement information is subtracted (step 305). As a result, only the surveillance image can be extracted from data having a combination of the surveillance image and the supplement information image.

If the mode is the image display mode inclusive of the supplement information at the step 303, then processing of the steps 304 and 305 is skipped.

Subsequently, the quantized DCT coefficient block group derived at the step 302 or step 305 is dequantized to obtain the DCT coefficient block group (step 306). The DCT coefficient block group is subjected to IDCT (Inverse DCT) to restore 8 by 8 pixel blocks (step 307). And the decoded 8 by 8 pixel blocks are subjected to reconstruction (step 308). As a result, the surveillance image data can be decoded.

The processing of the above described steps 302, 304, and 306 to 308 may be conducted by either the compressor/expander 8 in the surveillance device 20 or the expander 12 in the surveillance video reproducing device 30, or software in the CPU 1.

The JPEG data for image display reproduced (decoded) by conducting the processing shown in the flow chart of FIG. 7 is transferred to the D-A converter 9, converted to an analog signal, and thereafter displayed on the monitor 10. A display example of an image displayed on the monitor 10 at this time will now be described.

Figure 8:
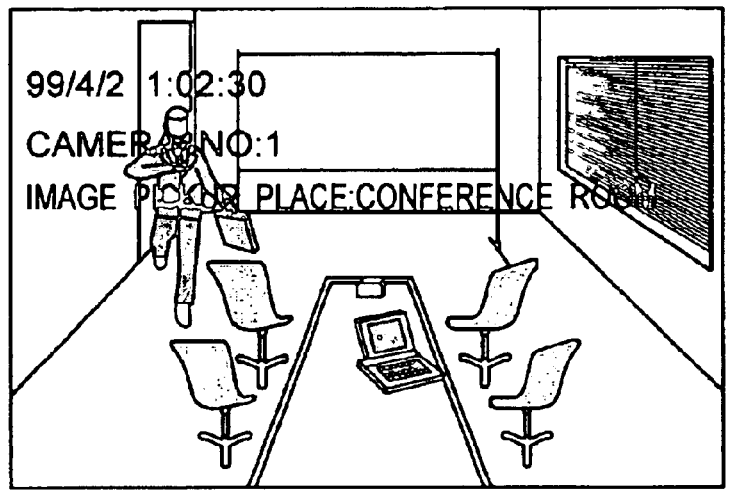
FIG. 8 is a diagram showing a reproduction display example of a recorded image of a first embodiment.

FIG. 8 shows an image display example in the case where the mode is a display mode inclusive of the supplement information at the step 303 of FIG. 7. In FIG. 8, a combination of the surveillance image picked up by the surveillance camera and the supplement information shown in FIG. 6 is displayed. In such a display image, the supplement information image, such as the image pickup date and time, camera number, and image pickup place, can be displayed together with the picked up surveillance image. Such a display image is very effective in retrieving a required surveillance image on the monitor 10.

Figure 9:
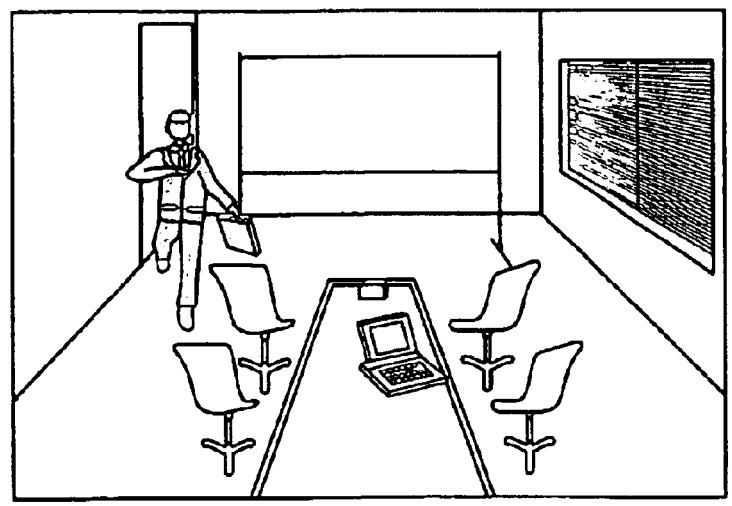
FIG. 9 is a diagram showing a reproduction display example of a recorded image of a first embodiment.

FIG. 9 shows an image display example in the case where the mode is not a display mode inclusive of the supplement information (that is, a mode displaying no supplemental information) at the step 303 of FIG. 7. In FIG. 9, the surveillance image picked up by the surveillance camera 7 is displayed on the monitor 10. In FIG. 9, the supplement information, such as the image pickup date and time, camera number, and image pickup place, accompanying the surveillance image is not displayed. Such a display image is used to, for example, analyze the content of the surveillance image. If the supplement information, such as the image pickup date and time, camera number, and image pickup place, accompanying the surveillance image is simultaneously displayed, then the supplement information is displayed on the monitor 10 so as to superpose on the surveillance image. As a result, information of the surveillance image of that portion is lost.

In the first embodiment, non-compressed surveillance image data before being encoded to JPEG data is not combined with supplement information image data. The quantized DCT coefficient block which appears in the process of encoding the JPEG data is combined with the supplement information. Even in such image display as not to display the supplement information image as shown in FIG. 9, therefore, it becomes possible to effect display without degrading the picture quality of the original surveillance image.

DCT and quantization are irreversible compression. If DCT or quantization is conducted after the surveillance image data has been combined with the supplement information image data, therefore, the surveillance image data cannot be separated from the supplement information image data by conducting inverse DCT or dequantization. On the other hand, Huffman encoding is reversible compression. Even if Huffman encoding is conducted after the surveillance image data has been combined with the supplement information image data, therefore, original data can be restored by conducting Huffman decoding. As a result, the surveillance image data can be separated from the supplement information image data easily.

Furthermore, in the present first embodiment, the supplement information includes three kinds of information: the image pickup date and time, the camera number, and image pickup place. For facilitating image retrieval, however, it is conceivable to combine a larger number of kinds of supplement information. As the number of kinds of combined supplement information image increases, however, the ratio of the supplement information image to the surveillance image becomes greater. In the case where JPEG data for image display is reproduced with the mode of display inclusive of the supplement information image, therefore, there is posed a problem that most of the reproduced display image is hidden by the supplement information image. If it becomes possible to display the surveillance image exclusive of the supplement information without degrading the picture quality as in the present first embodiment, very effective means are provided to retrieval and analyses of surveillance images.

Furthermore, JPEG data recorded in the scheme of the present first embodiment has been encoded in accordance with an algorithm of an international standard. In other words, the JPEG data recorded in the scheme of the present first embodiment can be reproduced even by a commercially available JPEG decoder. (In that case, the processing of the step 302 and steps 306 to 308 shown in FIG. 7 is conducted). However, such a commercially available JPEG decoder is not equipped with means for removing the supplement information and then decoding. Therefore, an image reproduced by the JPEG decoder is displayed necessarily in combination with the supplement information image.

In the above described first embodiment, there has been shown such a scheme that one frame image picked up at arbitrary time is recorded and reproduced. However, a typical surveillance system for crime prevention continues to record images supplied from a surveillance camera for 24 hours per day. In other words, if it is specified in the surveillance device 20 having one surveillance camera connected thereto to conduct JPEG encoding on one frame image per second, then images of 86400 frames are subjected to JPEG encoding in 24 hours. In the above described first embodiment, supplement information to be combined is subjected to JPEG encoding (encoded to JPEG data), and the resultant JPEG data is stored in the header portion of JPEG data of JPEG encoded image. Therefore, the recording capacity of the recorder 3 is not a little pressed.

As a second embodiment, a recording scheme minimizing the quantity of data recorded in the recorder 3 will now be described.

Figure 10A:
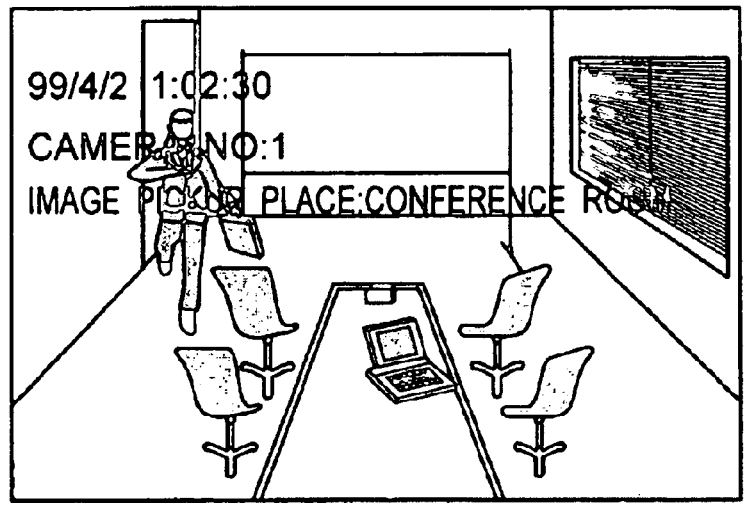
FIGS. 10A and 10B are diagrams of an image recording method of a second embodiment.
Figure 10B:
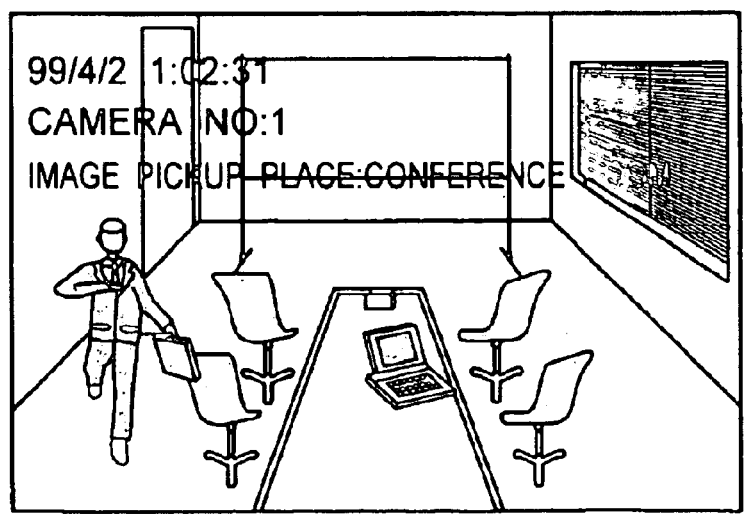

If it is specified to JPEG-encode one frame image per second, then supplement information pieces combined with images of 86400 frames recorded in 24 hours have very strong correlation. For example, images of two frames recorded in arbitrary two seconds are shown in FIGS. 10A and 10B. An image recorded in the first one second is shown in FIG. 10A, whereas an image recorded in the next one second is shown in FIG. 10B. As shown in FIGS. 10A and 10B, the date and time when the image of FIG. 10A is recorded (picked up) is two minutes and 30 seconds past one, Apr. 2, 1999, and the date and time when the image of FIG. 10B is recorded (picked up) is two minutes and 31 seconds past one, Apr. 2, 1999. Since the images of FIG. 10A and FIG. 10B are supplied from the same surveillance camera, the character string indicating the camera number and the image pickup place are the same. In other words, the character string indicating the supplement information combined with the image of FIG. 10A differs from that combined with the image of FIG. 10B in that the former one has 30 seconds whereas the latter one has 31 seconds. In short, they have a difference between "0" and "1." When JPEG-encoding the image of FIG. 10B, therefore, a difference between the supplement information to be combined with the image of FIG. 10B and the supplement information to be combined with the image of FIG. 10A is stored in the header portion of the JPEG data generated from the image of FIG. 10B, as the supplement information to be combined with the image of FIG. 10B. By doing so, the quantity of the JPEG data can be reduced.

Processing of combining the supplement information with the surveillance image in the second embodiment will now be described by referring to a flow chart of FIG. 11.

As shown in FIG. 11, data indicating a camera number included in the vertical retrace line interval transferred to the main storage 2 is first extracted and decoded (step 401). Furthermore, data indicating the installation place of a camera corresponding to the camera number obtained at the step 401 is acquired from the main storage 2 or the recorder 3, and the current date and time are acquired from the clock (step 402). Subsequently, in the compressor/expander 8, a bit map having an image size equivalent to or smaller than an image size of the surveillance image data obtained by the processing of FIG. 4 in the compressor/expander 8 is generated, and a character string indicating the image pickup date and time, the camera number, and the image pickup place is drawn in arbitrary positions of the bit map (step 403). Subsequently, a difference between the bit map and a bit map indicating supplement information of an image recorded immediately before is calculated (step 404). A processing method at this time will now be described by referring to FIG. 12.

FIG. 12 shows a bit map generated at the step 403. (However, the character string indicating the supplement information is omitted.) It is now assumed that the image size of the bit map has 32 pixels in the horizontal direction and 16 pixels in the vertical direction. If the bit map is divided into 8 by 8 pixel blocks, eight blocks having block numbers of 1 to 8 are obtained. In the processing of the step 404, comparison is conducted by taking a block as the unit.

Returning to FIG. 11, the processing of the steps 102 to 104 of FIG. 4 is conducted on the bit map obtained at the step 403. A quantized DCT coefficient block group is thus generated (step 405). The processing at the step 405 may be conducted either by the compressor/expander 8 or by software in the CPU 1.

Subsequently, by conducting Huffman decoding on the JPEG data for surveillance image obtained by the processing of FIG. 4, in the compressor/expander 8, a quantized DCT coefficient block group of the surveillance image data is extracted (step 406). In addition, the quantized DCT coefficient block group of the surveillance image and the quantized DCT coefficient block group of the supplement information image are added together (step 407). The quantized DCT coefficient block group after addition is subjected to Huffman encoding (step 408). Subsequently, the quantized DCT coefficient block group which has a difference from the bit map indicating the supplement information of the surveillance image recorded immediately before calculated in the step 404 is subjected to Huffman encoding (step 409). In the above described example, the quantized DCT coefficient block group corresponding to a block having a block number of 8 is subjected to Huffman encoding. Finally, JPEG data for supplement information obtained at the step 409 is stored in the header portion of the JPEG data for image display obtained at the step 408 (step 410), and processing is finished.

As heretofore described, in the second embodiment, the JPEG data for supplement information is generated by, for example, encoding one 8 by 8 pixel block. In the first embodiment, the JPEG data for supplement information is generated by encoding all of eight 8 by 8 pixel blocks. Therefore, the quantity of data stored in the header portion of the JPEG data for image display is reduced to ⅛. It thus becomes possible to minimize the quantity of recorded data.

When recording a plurality of camera images, the difference of supplement information can be managed for each of cameras by using the camera number acquired at the step 401.

Furthermore, JPEG data for image display obtained by combining with a supplement information image and recorded by the recording scheme in the first embodiment can be reproduced normally with the contents of the JPEG data for image display. If, in the second embodiment, recording is conducted by using the recording scheme of the first embodiment every several to several tens frames, therefore, it becomes possible to conduct random retrieval every several to several tens frames.

The JPEG data for image display recorded by using the recording scheme of the second embodiment can be decoded in the same way by using the flow chart of FIG. 7. Between the step 304 and the step 305, however, processing described hereafter needs to be inserted.

First, a quantized DCT coefficient block group of the JPEG data for supplement information used to decode the JPEG data for surveillance image recorded immediately before is acquired. The quantized DCT coefficient block group obtained at the step 304 is replaced by the quantized DCT coefficient block group thus acquired. By using the quantized DCT coefficient block group after the replacement, the processing of the step 305 is conducted.

FIGS. 13A, 13B and 13C are bit maps showing supplement information to be combined with three frame images which are consecutive in time. (The bit maps have been generated at the step 403 of FIG. 11. Character strings indicating the supplement information are omitted.) The time elapses in the order of FIG. 13A, FIG. 13B, and FIG. 13C. The bit map of FIG. 13A differs from the bit map of FIG. 13B in blocks 4a and 4b. The bit map of FIG. 13B differs from the bit map of FIG. 13C in blocks 8b and 8c. Furthermore, it is assumed that a surveillance image to be combined with the bit map of FIG. 13A is recorded by using the recording scheme of the first embodiment and a surveillance image to be combined with the bit map of FIG. 13B and a surveillance image to be combined with the bit map of FIG. 13C are recorded by the recording scheme of the second embodiment.

When reproducing these surveillance images, JPEG data obtained by combining with the bit map of FIG. 13A and recorded is decoded by using the JPEG data for supplement information image including blocks 1a to 8a. JPEG data obtained by combining with the bit map of FIG. 13B and recorded is decoded by using the JPEG data for supplement information image including blocks 1a, 2a, 3a, 4b, 5a, 6a, 7a and 8a. JPEG data for supplement information image having the block 4b is acquired from the header portion of JPEG data for image display obtained by encoding an image with which the bit map of FIG. 13B should be combined. JPEG data obtained by combining with the bit map of FIG. 13C and recorded is decoded by using the JPEG data for supplement information image including blocks 1a, 2a, 3a, 4b, 5a, 6a, 7a and 8c. JPEG data for supplement information image having the block 8c is acquired from the header portion of JPEG data for image display obtained by encoding an image with which the bit map of FIG. 13C should be combined.

A method for determining whether recorded JPEG data (inclusive of supplement information) has been falsified in the first and second embodiments will now be described.

In the embodiments, information concerning combined supplement information is stored in the header portion of the JPEG data for image display. The case where a commercially available JPEG encoder and a commercially available JPEG decoder (no matter whether hardware processing is used or software processing is used) are used for falsification will now be described.

If image data obtained by decoding JPEG data recorded by using the present invention is amended (falsified) and encoded again, then information concerning combined supplement information is stored in the header portion of the recorded JPEG data. If the image is amended and subjected to JPEG encoding again by using a JPEG encoder and a JPEG decoder which do not recognize supplement information image data, then the supplement information image data which existed before decoding disappears, and it becomes impossible to separate (or extract) the combined supplement information image data. Also in the case of the mode in which supplement information is not displayed, shown in the flow chart of FIG. 7, therefore, the supplement information is not separated, and the image as shown in FIG. 8 is displayed.

Figure 14:
FIG. 14 is a diagram showing a reproduction display example of a recorded image of a first embodiment.

It is now assumed that the JPEG encoder and JPEG decoder in use have a function of holding and encoding information stored in the JPEG header portion when decoding is conducted. If in this case a falsified place is the portion combined with the supplement information, then the supplement information cannot be separated cleanly in the case of the mode in which supplement information is not displayed, in the flow chart of FIG. 7. As shown in FIG. 14, therefore, display of the portion of the supplement information is not conducted cleanly and dust (noise) remains. By detecting dust (noise), therefore, it becomes possible to determine whether the recorded JPEG data has been falsified.

In the above described falsification detection method, the recorded JPEG data is decoded and subjected to judgment with the eye. Furthermore, if a portion which is not combined with supplement information is falsified, falsification cannot be detected.

Therefore, a third embodiment making possible sure falsification detection in order to hold a recorded (surveillance) image having high evidence capability will now be described.

Figure 15:
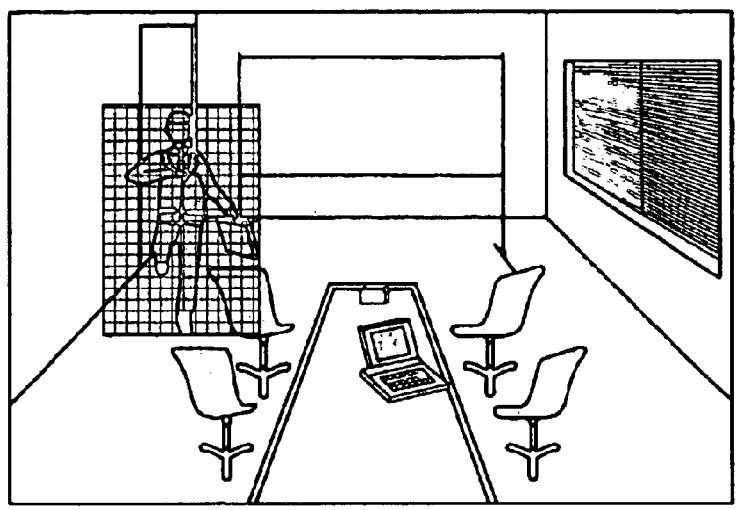
FIG. 15 is a diagram showing a reproduction display example of a recorded image of a third embodiment.

In the surveillance device 20 shown in FIG. 1, the A-D converter 5 is formed so as to be capable of transferring not only the data indicating the camera number included in the vertical retrace line interval of surveillance video data but also (non-compressed) image data portion to the main storage 2. And there is provided means for detecting a moving body in the surveillance image data. To be concrete, the moving body detection means is implemented by a program executed by the CPU 1. The moving body detection can be conducted by, for example, calculating a difference between pixels of two images outputted from the same camera at different time points. If the difference is equal to or greater than a predetermined value (a predetermined threshold), then a pixel yielding such a difference or a block of an arbitrary size including that pixel is judged to be a moving body. Arbitrary information is combined with the detected moving body portion in the same way as the method for combining the supplement information described with reference to the first embodiment (i.e., the steps 202 to 209 in the flow chart of FIG. 5). Since the present embodiment aims at preventing falsification, combined information need not be significant information such as the camera number or date. For example, a bit map of half tone may be combined. If image data transferred from the A-D converter 5 to the main storage 2 is an image shown in FIG. 9 and a person seen on the left side of the image is detected as a moving body, then JPEG data which is decoded as shown in FIG. 15 is generated. Since usually the risk that a moving body portion is falsified is great, the method of combining supplement information with a moving body portion is very effective.

A scheme for automatically detecting falsification instead of detecting falsification with the eye will now be described.

When encoding an image to be recorded to JPEG, a feature value of the encoded image is calculated and its result is stored in the header portion of the JPEG data, in the present scheme. The feature value is a peculiar value depending upon the length (quantity) of image data. As a feature value, there is, for example, a check sum of a quantized DCT coefficient block group. Furthermore, the feature value may be calculated by using a unilateral function such as the hash function. For example, a hash value of the JPEG data for image display is used as the feature value. Hereafter, an example using the above described check sum will be described.

Figure 16:
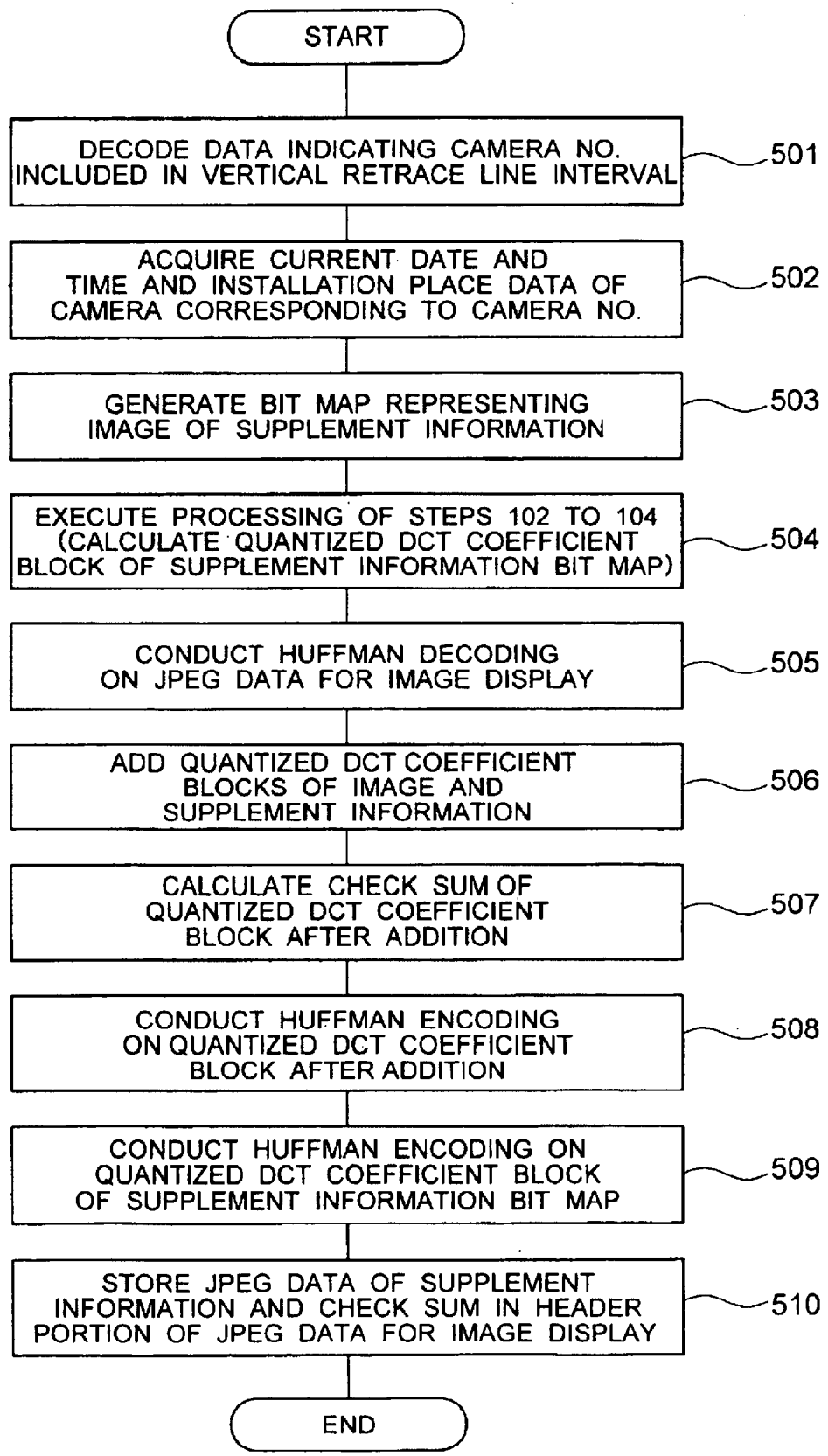
FIG. 16 is a diagram showing a processing flow chart of an image recording method of a third embodiment.

A processing flow chart of the present scheme is shown in FIG. 16. Processing of steps 501 to 506 is the same as that of the steps 201 to 206 in the flow chart of FIG. 5, respectively.

A check sum of at least one quantized DCT coefficient block obtained by executing the processing of the steps 501 to 506 one after another is calculated (step 507). The quantized OCT coefficient block obtained at the step 506 is subjected to Huffman encoding (step 508). In addition, the quantized DCT coefficient block of the supplement information bit map is subjected to Huffman encoding (step 509). Finally, the JPEG data obtained at the step 509 and the check sum obtained at the step 507 are stored in the header portion of the JPEG data obtained at the step 508 (step 510), and processing is finished.

Figure 17:
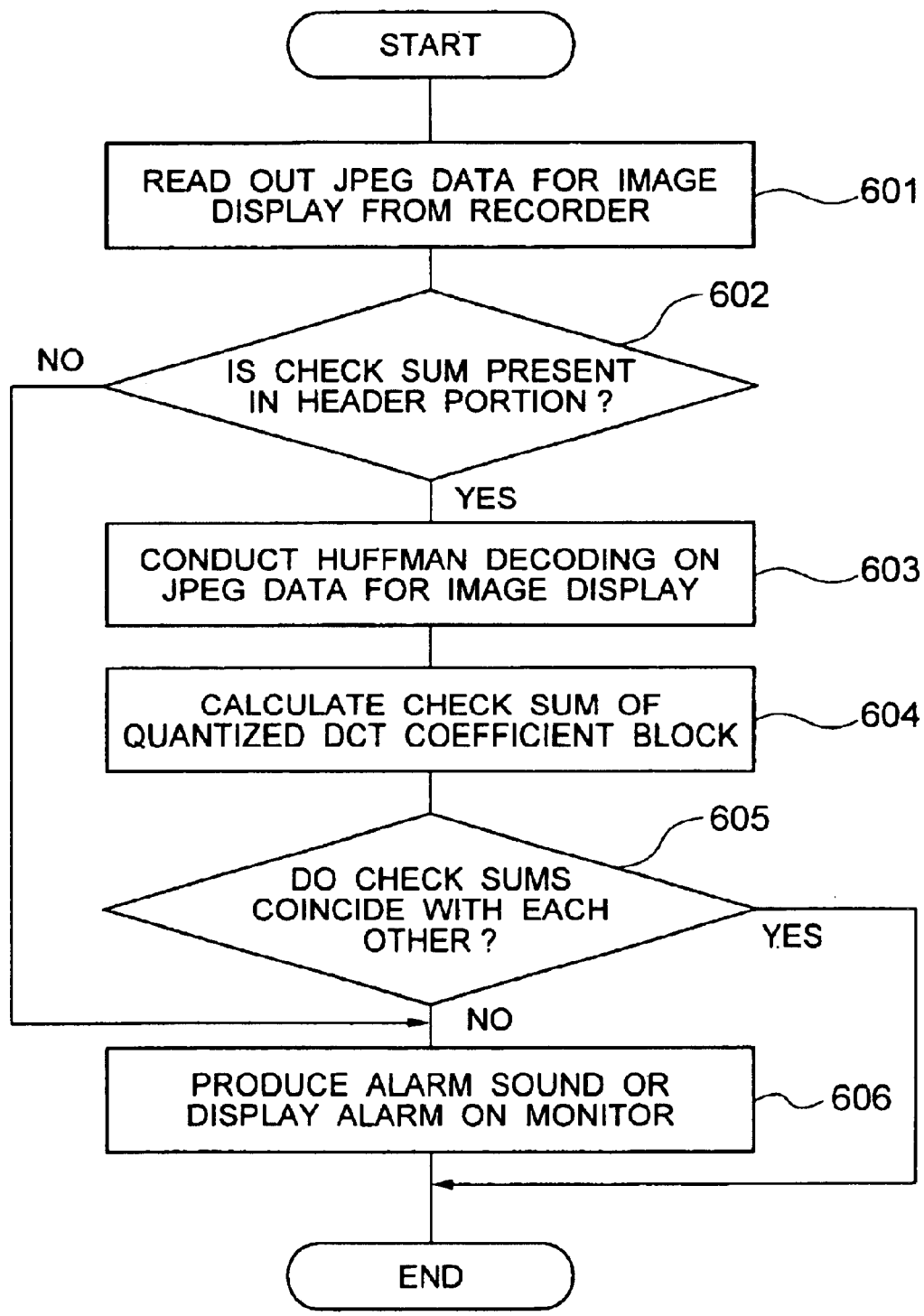
FIG. 17 is a diagram showing a processing flow chart of a recorded image reproducing method of a third embodiment.

A flow chart of processing for automatically detecting falsification is shown in FIG. 17.

First, JPEG data for image display to be reproduced is read out from the recorder 3 (step 601). It is determined whether data representing a check sum exists in the header portion of the JPEG data for image display (step 602). If data representing the check sum exits, then the JPEG data for image display is subjected to Huffman decoding to yield a quantized DCT coefficient block group (step 603). Subsequently, the check sum of the quantized DCT coefficient block group is calculated (step 604). The calculated check sum is compared with the check sum stored in the header portion (step 605). If the check sums coincide with each other, the JPEG data is judged not to be falsified. In other words, the feature value of the JPEG data for image display is linked to the JPEG data for image display.

If data representing a check sum does not exist in the header portion of the JPEG data at the step 602, or if the check sums do not coincide with each other in the step 605, then the JPEG data is judged to have been falsified. If the JPEG data is judged to have been falsified, then the user is informed that falsification has been conducted, explicitly by emitting an alarm sound or displaying an alarm display on the monitor 10 (step 606), and the processing is finished.

If an image obtained by decoding the JPEG data derived by the processing of FIG. 16 is falsified and encoded again, then the probability that the check sum changes from its original value is very high. By checking the check sum, therefore, it can be automatically detected with a near certainty that falsification has been done. It is now assumed that a check sum is represented as 4 byte data. When falsification is conducted and encoding is performed again, the probability that the check sum coincides with the original check sum is as very low as 1/(40 trillion).

If data representing the check sum which should be stored in the header portion of the JPEG data has disappeared at the step 602, then it is meant that data has been encoded by a different encoder. Therefore, it can be automatically detected whether falsification has been done, without calculating the check sum.

Thus, in the third embodiment, it can be automatically determined with ease whether the recorded JPEG data has been falsified. As a result, a surveillance system which holds a recorded (surveillance) image having high evidence capability can be provided.

A surveillance system of the present invention is suitable for surveilling presence/absence of an intruder, behavior of a subject person, and the operation state of a subject (such as the operation state of plant devices).

According to the present invention, a surveillance system facilitating the retrieval, management and reproduction without losing the evidence capability of recorded images can be provided.

Furthermore, a surveillance system capable of detecting that a recorded (picked up) image has been falsified can be provided.

What is claimed is:

1. An image processing system comprising:

a camera; and an image processor for processing camera image data obtained from said camera, said image processor comprising:

supplement information image generation means for imaging supplement information relating to said camera image data and generating supplement information image data;

combining means for combining data obtained in middle of JPEG encoding of said camera image data with data obtained in middle of JPEG encoding of said supplement information image data; and Huffman encoding means for conducting Huffman encoding on composite data obtained by said combining means difference detection means for calculating a difference between pixels of two said camera image data input at different times from said camera, said difference being obtained for each pixel; and judgment means for judging that when said difference is larger than a predetermined value, a block of given size including pixels from which said difference is obtained corresponds to a moving portion in said camera image data, wherein said combining means combines data obtained in middle of JPEG encoding of said camera image data and data obtained in middle of JPEG encoding of said supplement information image data so that said supplement information image data is visible in said block indicating said moving portion in said camera image data, when JPEG data for image display obtained by Huffman encoding means is displayed.

2. The image processing system according to claim 1, wherein said image processor comprises:

linking means for linking JPEG data for image display obtained by said Huffman encoding means to JPEG data for supplement information image, obtained by conducting JPEG encoding on said supplement information image data.

3. The image processing system according to claim 1, wherein said image processor comprises:

display image decoding means for conducting Huffman decoding on JPEG data for image display obtained by said Huffman encoding means; and removal means for removing data in middle of JPEG encoding of said supplement information image data from JPEG data for image display subjected to Huffman decoding.

4. The image processing system according to claim 1, wherein said image processor comprises:

display image decoding means for conducting Huffman decoding on JPEG data for image display obtained by said Huffman encoding means;

supplement information image decoding means for conducting Huffman decoding on JPEG data for supplement information image obtained by conducting JPEG encoding on said supplement information image data; and removal means for removing JPEG data for supplement information image subjected to Huffman decoding from JPEG data for image display subjected to Huffman decoding.

5. The image processing system according to claim 1, wherein said image processor comprises:

difference information generation means for generating difference information between first supplement information image data relating to a first camera image data and second supplement information image data relating to a second camera image data;

difference information JPEG encoding means for conducting JPEG encoding on said difference information;

difference information linking means for linking JPEG data for image display obtained by said Huffman encoding means to JPEG data for difference information, obtained by said difference information JPEG encoding means.

6. The image processing system according to claim 1, wherein said image processor comprises:

feature value generation means for generating feature value peculiar to JPEG data for image display obtained by said Huffman encoding means; and feature value linking means for linking said JPEG data for image display to said feature value data.

7. The image processing system according to claim 6, wherein said image processor comprises:

separation means for separating said JPEG data for image display and said feature value data from linked data obtained by said feature value linking means;

post-separation feature value generation means for generating post-separation feature value data peculiar to the JPEG data for image display obtained by said separation means; and decision means for deciding that the feature value obtained by said separation means does not coincide with said post-separation feature value data.

8. The image processing system according to claim 6, wherein said image processor comprises:

decision means for deciding that linked data obtained by said feature value linking means does not include said feature value data.

9. The image processing system according to claim 6, wherein said feature value generation means generates as said feature value data, a check sum of a quantized DCT coefficient block obtained by adding a quantized DCT coefficient block obtained in middle of JPEG encoding of said camera image data and a quantized DCT coefficient block obtained in middle of JPEG encoding of said supplement information image data.

10. The image processing system according to claim 6, wherein said feature value generation means generates a hash value of said JPEG data for image display as said feature value data.

11. An image processor comprising:

input means for inputting a camera image picked up by a camera;

supplement information image generation means for imaging supplement information relating to said camera image and generating supplement information image data;

camera image compression means for compressing camera image data of said camera image;

supplement information image compression means for compressing said supplement information image data;

difference detection means for calculating a difference between pixels of two said camera image data input at different times from said camera, said differences being obtained for each pixel; and judgment means for judging that when said difference is larger than a predetermined value, a block of given size including pixels from which said difference is obtained corresponds to a moving portion in said camera image data, combining means for combining data obtained in middle of compression of said camera image data with data obtained in middle of compression of said supplement information image data so that said supplement information image data is visible in said block indicating said moving portion in said camera image data, when data obtained by said combining means is displayed.

12. The image processor according to claim 11, wherein said combining means adds a quantized discrete cosine transform coefficient block obtained by conducting discrete cosine transform and then quantization on said camera image data, and a quantized discrete cosine transform coefficient block obtained by conducting discrete cosine transform and then quantization on said supplement information image data.

13. The image processor according to claim 11, comprising:

camera image expander means for conducting Huffman decoding on compressed data for camera image obtained by said camera image compression means, wherein said supplement information image compression means conducts discrete cosine transform and then quantization on said supplement information image data, and said combining means adds the compressed data for camera image subjected to Huffman decoding and the supplement information image data subjected to discrete cosine transform and then quantization.

14. The image processor according to claim 11, comprising:

supplement information image decoding means for conducting Huffman decoding on compressed data for supplement information image obtained by said supplement information image compression means, wherein said camera image compression means conducts discrete cosine transform and then quantization on said camera image data, and said combining means adds the compressed data for supplement information image subjected to Huffman decoding and camera image data subjected to discrete cosine transform and then quantization.

15. The image processor according to claim 11, comprising:

camera image expander means for conducting Huffman decoding on compressed data for camera image obtained by said camera image compression means; and supplement information image decoding means for conducting Huffman decoding on compressed data for supplement information image obtained by said supplement information image compression means, and said combining means adds the compressed data for camera image subjected to Huffman decoding and the compressed data for supplement information image subjected to Huffman decoding.

16. The image processor comprising:

input means for inputting a camera image picked up by a camera;

supplement information image generation means for imaging supplement information relating to said camera image and generating supplement information image data;

compression means for conducting irreversible compression and then reversible compression on image data difference detection means for calculating a difference between pixels of two said camera image data input at different times from said camera, said difference being obtained for each pixel; and judgment means for judging that when said difference is larger than a predetermined value, a block of given size including pixels from which said difference is obtained corresponds to a moving portion in said camera image data, combining means for combining camera image data of said camera image subjected to the irreversible compression in said compression means with said supplement information image data subjected to the irreversible compression in said compression means so that said supplement information image data is visible in said block indicating said moving portion in said camera image data, when data obtained by said combining means is displayed, composite data obtained by said combining means being subjected to reversible compression in said compression means.

17. The image processor according to claim 16, wherein said combining means combines said camera image data after being subjected to discrete cosine transform and before being subjected to Huffman encoding with said supplement information image data after being subjected to discrete cosine transform and before being subjected to Huffman encoding.

18. The image processor according to claim 16, wherein said combining means combines said camera image data after being quantized and before being subjected to Huffman encoding with said supplement information image data after being quantized and before being subjected to Huffman encoding.

19. An image processor comprising:

a first encoding means for executing DCT conversion on a first image data, quantizing said first image data subjected to said DCT conversion and executing Huffman encoding on said first image data quantized;

a second encoding means for executing DCT conversion on a second image data, quantizing said second image data subjected to said DCT conversion and executing Huffman encoding on said second image data quantized, difference detection means for calculating a difference between pixels of two or more of said first image data input at different times, said difference being obtained for each pixel;

judgment means for judging that when said difference is larger than a predetermined value, a block of given size including pixels from which said difference is obtained corresponds to a moving portion in said first image data;

linking means for linking said first image data encoded by said first encoding means to said second image data encoded by said second encoding means;

transmission means for transmitting linked data obtained from said linking means to a storage apparatus; and decoding means for executing Huffman decoding on said first image data of said linked data in said storage apparatus, executing inverse quantization on said first image data subjected to said Huffman decoding and executing inverse DCT conversion on said first image data subjected to said inverse quantization, wherein said first encoding means combines said first image data subjected to said DCT conversion quantized by said first encoding means and said second image data subjected to said DCT conversion quantized by said second encoding means and executes Huffman encoding on said first image data combined so that said second image data is visible in a block indicating said moving portion in said first image data, when data obtained by said first encoding means are displayed, and said decoding means executes Huffman decoding on said second image data of said linked data in said storage apparatus, subtracts said second image data subjected to said Huffman decoding from said first image data subjected to said Huffman decoding, executes inverse quantization on said first image data subjected to the subtraction and executes inverse DCT conversion on said first image data subjected to said inverse quantization.

20. The image processor according to claim 19, comprising judging means for judging whether or not a display mode is a mode which displays said first image data comprising said second image data, wherein when said display mode is a mode which displays said first image data comprising said second image data, said decoding means executes inverse quantization on said first image data subjected to said Huffman decoding and executes inverse DCT conversion on said first image data subjected to said inverse quantization without subtracting said second image data subjected to said Huffman decoding from said first image data subjected to said Huffman decoding, and when said display mode is a mode which displays said first image data without comprising said second image data, said decoding means subtracts said second image data subjected to said Huffman decoding from said first image data subjected to said Huffman decoding, executes inverse quantization on said first image data subjected to the subtraction and executes inverse DCT conversion on said first image data subjected to said inverse quantization.

21. The image processor according to claim 20, wherein said first image data comprises image data picked up by a camera, and said second image data comprises character image data relating to said first image data.

* * * * *